United States Patent [19]

Kochert et al.

[11] 4,246,570
[45] Jan. 20, 1981

[54] OPTICAL WAND FOR MECHANICAL CHARACTER RECOGNITION

[75] Inventors: Wilfried Kochert; Paul Hauff, both of Constance, Fed. Rep. of Germany

[73] Assignee: Computer Gesellschaft Konstanz mbH, Constance, Fed. Rep. of Germany

[21] Appl. No.: 31,923

[22] Filed: Apr. 20, 1979

[30] Foreign Application Priority Data

Apr. 20, 1978 [DE] Fed. Rep. of Germany ....... 2817341

[51] Int. Cl.$^3$ .............................................. G06K 9/22
[52] U.S. Cl. ..................... 340/146.3 SY; 340/146.3 H
[58] Field of Search ............ 340/146.3 SY, 146.3 SG, 340/146.3 MA, 146.3 H, 146.3 AC; 235/472; 250/208, 567, 568

[56] References Cited

U.S. PATENT DOCUMENTS

| | | | |
|---|---|---|---|
| 3,947,817 | 3/1976 | Requa | 340/146.3 MA |
| 3,964,022 | 6/1976 | Martin | 340/146.3 SY |
| 4,056,804 | 11/1977 | Whitfield et al. | 340/146.3 SY |
| 4,088,981 | 5/1978 | Gott | 340/146.3 SY |
| 4,104,616 | 8/1978 | Isshiki et al. | 340/146.3 Y |
| 4,115,703 | 9/1978 | Dobras | 340/146.3 SY |
| 4,118,687 | 10/1978 | McWaters et al. | 340/146.3 SY |
| 4,158,194 | 6/1979 | McWaters et al. | 340/146.3 SY |

FOREIGN PATENT DOCUMENTS 2619014 11/1977 Fed. Rep. of Germany .... 340/146.3 R

OTHER PUBLICATIONS

Chow, "An Optimum Character Rec. System . . . ", IRE Trans on Electronic Computers, vol. EC-6, No. 1, Mar. 1957, pp. 247-254.

Primary Examiner—Leo H. Boudreau
Attorney, Agent, or Firm—Hill, Van Santen, Steadman, Chiara & Simpson

[57] ABSTRACT

An optical wand for automatically recognizing characters in a plurality of fonts incorporates a manually movable scanner incorporating a light source and a sensor array composed of a diode matrix. A first preprocessing unit is connected to receive the output from the scanner, and includes a correlation unit for buffering the data and apparatus for eliminating the effect of different characteristics of the individual photo diodes. The first preprocessing unit also includes a row tracking circuit and a segmentation circuit for presegmenting and for centering the character. Further segmentation, and filtering of the image is carried out by a second preprocessing unit which is decoupled from the first preprocessing unit, so that its operation is concurrent with that of the scanner. A recognition unit, decoupled from the second preprocessing unit, is connected thereto, and establishes individual values for the scanned characters by use of a quadratic polynomial classifier.

7 Claims, 6 Drawing Figures

OPTICAL WAND FOR MECHANICAL CHARACTER RECOGNITION

BACKGROUND

1. Field of the Invention

The present invention relates to mechanical character recognition apparatus, and more particularly to such apparatus incorporating an optical wand for scanning characters to be recognized and for producing a scan pattern in response thereto.

2. The Prior Art

U.S. Pat. No. 3,947,817 discloses an optical wand, which is adapted to be manually moved in an arbitrary direction relative to a row of characters, at a given maximum speed, for generating signals corresponding to the features of the characters. Such wands are used as peripheral data acquisition systems and have wide application in connection with POS terminals for reading labels; bank terminals for reading account numbers on checks and documents; and other terminals such as those for reading identity cards, etc. The signals produced by the wand pose a relatively difficult character recognition problem, on account of the variations in the manual scanning process.

Such wands must be easy to handle and must be functionally reliable. Reliability has proved difficult to achieve, because the manual scanning of the characters produces a relatively wide variation of scanning conditions. For example, the paper or other carrier on which the characters appear may have considerably different reflection properties from time to time; the manual scanning process is carried out at different times at different speeds, with reversal of the scanning direction; and during the scanning, the wand may be tilted or even moved obliquely relative to the row of characters. Despite these difficulties, it is important that characters be scanned once and only once, and not omitted, because duplicate scanning or omission leads to faulty information.

The price-efficiency ratio of the wand is also important, since wands can be economically employed in connection with data acquisition systems only if they are adaptable to various applications, so that a flexible basic device may be manufactured in large numbers, and readily modified for several applications.

In the prior art, the various conditions imposed on such wands have led to a compromise, which limit their capacities. In particular, the classification methods which have been used are limited to relatively simple ones, which permit easy character recognition of single characters during the time allowed by the scanning speed. This not only limits the application of the wand to a specific type of character, but also to a relatively small number of characters. Even so, the recognition reliability is not great so that frequently the characters are not recognized and must be rescanned before recognition is possible.

It is also known in the prior art to carry out a plurality of recognition steps upon the scanned characters as they are being scanned, i.e., to make available and analyze instantaneous scan patterns which occur during scanning.

In the aforementioned U.S. patent, the scanning output from a photo diode matrix is used to form row codes. A character code is then derived from the row codes and, from a sequence of row codes, the most significant row code is selected in order to deduce the class association. This technique is effective only with character sections in specific preselected fields of vision of the diode matrix and blanks between those character sections. As the classification of characters is based on the analyzing effect of combinations of simple features, it is fundamentally impossible to exceed relatively low limits of recognition reliability.

More elaborate classification methods which are typically used in connection with high-speed document printers such as described in German Pat. No. 2,619,014, but such methods require relatively large intervals of time to reliably classify characters, and are therefore not suitable for use with hand manipulated scanners.

BRIEF DESCRIPTION OF THE PRESENT INVENTION

By the use of the present invention, it is possible to use elaborate classification programs to provide an efficient optical wand, and at the same time provide a high degree of recognition reliability and flexibility so that the wand can be adapted to a variety of applications. The present invention also provides the advantage of making it possible to automatically read different fonts.

In accordance with the one embodiment of the present invention, a non-linear classification method is employed which utilizes classifier data stored in programmable read-only memories, the contents of which can be adapted for different fonts. The recognition reliability of such non-linear classifiers is extremely high, although a relatively long time is required for the necessary calculations, since for each class, it is necessary to calculate an estimated value for the class assignment by carrying out a vector multiplication of the character vector with a class specific group of vector coefficients. In a practical example, where 500 calculating steps are required for each character class, if 32 character classes are contemplated, approximately 16,000 calculating steps would be required as a maximum in order to classify a single character.

In accordance with a more specific embodiment of the present invention, the optical wand of the present invention is constructed of three separate units which are decoupled from each other, namely, a scanning unit, a preprocessing unit, and a classifier unit. Each unit operates basically independently of the others, by virtue of buffering the relevant data. Preferably, a microprocessor is used in the preprocessing unit and performs part of the calculation functions for the classification. The final classification by the classifier unit is sufficiently decoupled from the preprocessing of the characters to enable parallel operation to take place, which allows the use of a relatively slow microprocessor and still achieve reliable character recognition within the time constraints of real time scanning.

These and other objects and features of the present invention will become manifest by an inspection of the following description and the accompanying drawings.

BRIEF DESCRIPTION OF THE DRAWINGS

Reference will now be made to the accompanying drawings in which.

DESCRIPTION OF THE PREFERRED EMBODIMENT

Figure 1:
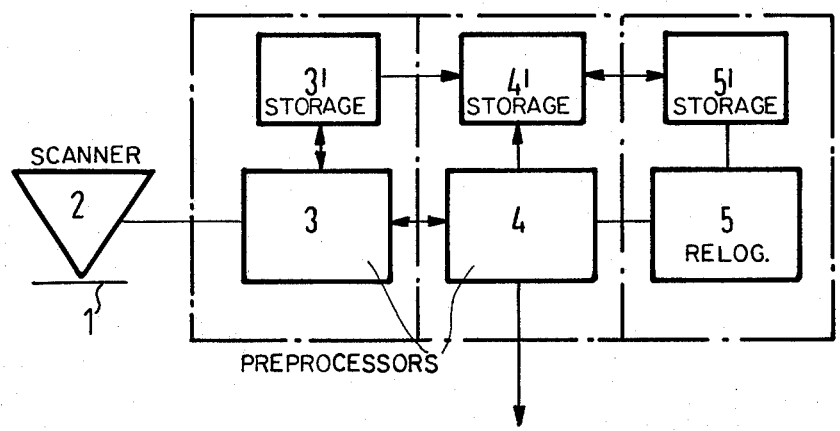
FIG. 1 is a functional block diagram of the fundamental construction of an optical wand constructed in accordance with the present invention.

Referring now to FIG. 1, the fundamental structure of the wand is shown. A data carrier 1 is scanned by a scanner 2 and the scanned data thereby obtained are fed to a first preprocessing unit 3. The preprocessing unit is assigned a first working memory or storage device 3' in which the video-signals or data bits emanating from the scanner 2 are stored with random access. In this first preprocessing unit 3, interference factors produced by the scanning process are eliminated from the scanned video-signals, and spaces separating the characters are identified.

As soon as this has been completed, the image contained at this time in the store 3' of the first preprocessing unit 3 is transferred to a memory or storage device 4' of the second preprocessing unit 4. From this time onwards, the further preprocessing of the transferred image is decoupled from the scanning preprocessing and thus can be independently pursued. This further preprocessing includes image clearing in which video-information not related to the character is omitted. The bit pattern corresponding to the character is also centered in both axes in the memory 4'. This centering does not require any displacement of the bit pattern contained in the memory 4' but involves the modification of addresses for the memory 4'.

When the memory 4' of the second preprocessing unit contains a bit pattern corresponding to a character of sufficient size, the preprocessing phase is concluded, having been largely carried out using a microprocessor system.

The character which has been preprocessed in this way can now be classified. Classification is carried out using a recognition unit 5 which is assigned a classifier memory or storage device 5'. The classification employs a quadratic polynomial classifier, and is consequently relatively elaborate in respect of its calculations. Therefore, the classification of a preprocessed character is largely carried out by a satellite computer system and the microprocessor system used for the preprocessing stage is free to preprocess the next character during classification of the previous character.

Figure 2:
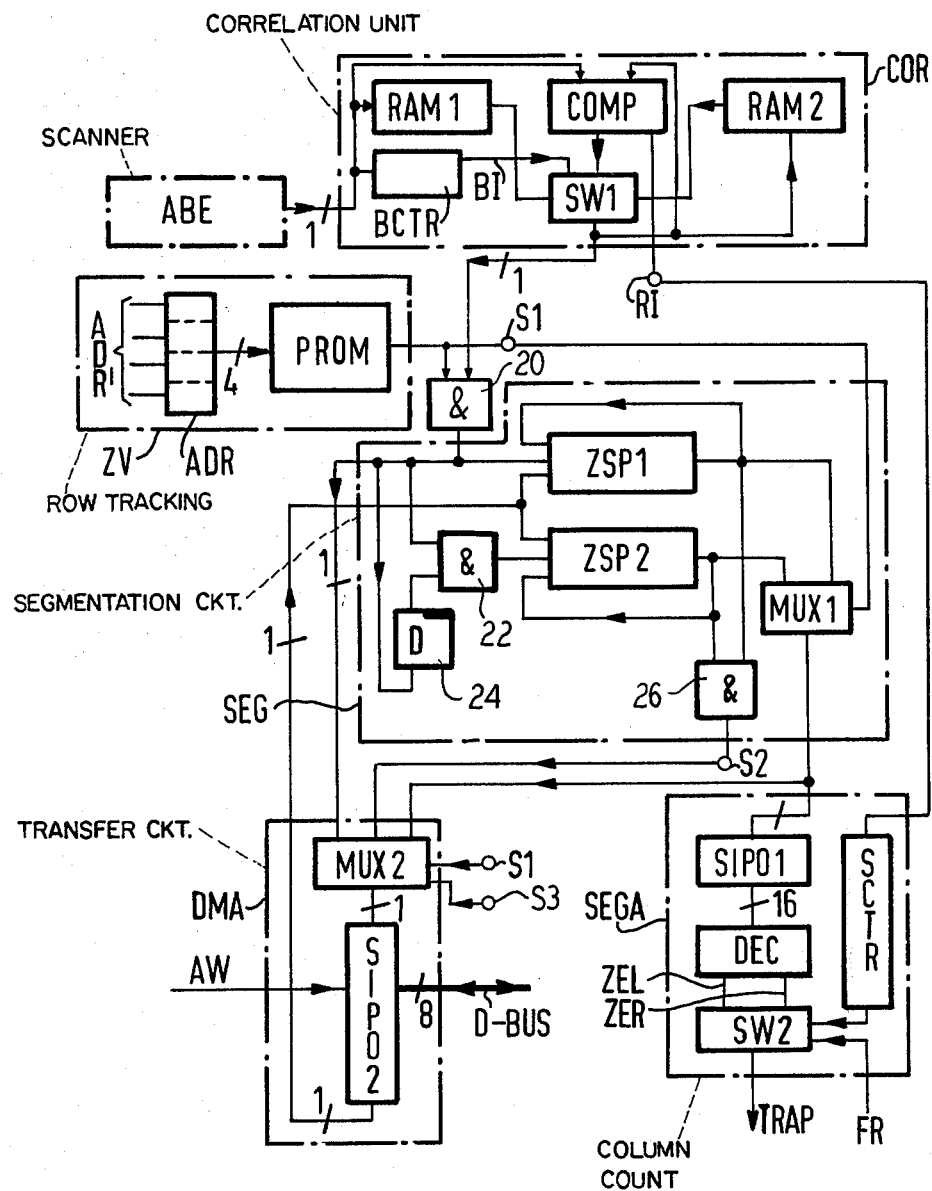
FIG. 2 is a functional block diagram of the preprocessing circuits.

FIG. 2 illustrates in detail those parts of the wand which correspond to the scanning unit 2 and the first preprocessing unit 3 in FIG. 1. In FIG. 2, the scanning unit is identified ABE. It includes a sensor array composed of photo-diodes arranged in 62 rows and 16 columns, which are scanned row-by-row to produce an output consisting of 16 parallel signals, one for each column. The signals for each column appear in serial fashion. The signals are amplified and quantized with a comparator into black-white digital values, the quantization threshold being dependent upon the contrast of the current video pattern. The scanning unit also comprises a light source whose lamp brightness is regulated in dependence upon the level of reflected brightness from the data carrier 1. In this way it is possible to compensate for different reflection coefficients of the data carrier 1 and for different distances between the scanning unit and the data carrier 1. The scanning unit ABE also includes a parallel-to-series converter which serves to convert the 16 digitalized scan signals of the scanned row into bit-serial video-signals at the output of the scanning unit ABE.

The two-dimensional sensor array which is employed in the scanning unit ABE allows scanning to be carried out independently of the speed with which the scanning unit is manually moved along the data carrier. The image repetition frequency of approximately 3 kHz is sufficiently high to ensure that, between two consecutive scan patterns, the scanned character will only move on by less than the width of a single scan element, i.e., 0.16 mm.

The serial video-signal produced by the scanning unit ABE is fed to the first preprocessing unit 3. This unit contains a correlation circuit COR, the components of which are shown in simplified form in FIG. 2. The correlation unit COR is described and claimed in copending Kochert application Ser. No. 029,016, filed Apr. 11, 1979 for "A Circuit Arrangement for Editing A Scanned Pattern", the disclosure of which is hereby incorporated by reference into this application.

The video-signal is intermediately stored in a first image memory RAM-1 having random access and a storage capacity of one complete scan pattern. A second memory RAM-2 is provided for storing an earlier scan pattern. As described in the above-identified Kochert application, the two scan patterns are compared with one another in a comparator circuit COMP in order to correlate deviations between the two scan patterns, and both scan patterns are supplied to inputs of a switching unit SW1. The black representing bits of the current video-signal are counted in a counter BCTR to produce a control signal BI which serves to distinguish bold (thick) from weak (thin) characters in the video-signal. The scan patterns intermediately stored in the two image memories RAM-1 and RAM-2 are, in video terms, superposed, and the video-elements which correspond to each other are disjunctively logic-linked to one another, by means of an OR gate within SW1. Bits representing the white elements are OR'ed together for bold characters, and the black elements of the video-signal are OR'ed together for weak characters. This serves to eliminate disturbances in the video-signal which have been caused by variations in the characteristics of the individual photo-diodes in the sensor array of the scanning unit.

This correlated video-signal is now further processed by means of a row tracking circuit ZV, which carries out the preliminary segmentation of the scanned video-pattern. The scan zone of the scanning unit has a height of 62 rows, which is considerably larger than the standard size of scanned characters. For the characters, a maximum of 32 rows is required. In order to determine the 32 line zone in which the character appears, the row tracking circuit ZV is used. The row tracking circuit includes a 4-bit address register ADR and a programmable read-only-memory PROM. The register ADR contained in the row tracking circuit ZV is set via address signals ADR'. If the position of a character pattern, within the scan zone, moves vertically (in the column direction) during the scanning of a row of print, the address contained in the address register ADR is corrected in accordance with the movement.

The fixed word store PROM of the row tracking circuit emits a gating signal S1 corresponding to the established analysis zone, which may be referred to as a release signal. Its length is 512 bits, corresponding to 32 rows of 16 bits each. It is applied to one input of an AND gate 20, which passes the enhanced video-signal from SW1.

The video-signal presented at the output of the gate 20 is constantly investigated to establish whether the video-pattern contains white columns. This is determined by means of a segmentation circuit SEG which is connected to receive the output of the gate 20. The segmentation circuit contains two 16 bit registers ZSP1 and ZSP2 which function as intermediate storage devices for the video-signal. These two registers are each 16 bits in length, the length of one row. The contents of each is recirculated and OR'ed with new data at the recirculating input. In the register ZSP1, each row is OR'ed with subsequent rows, so that the content of the register represents the projection of the image information onto a line parallel to the row of characters, and is sometimes referred to as the first shadow signal. This signal reveals where elements, which represent white columns in the scan pattern, occur in the scan pattern, relative to an item of black information.

The second register ZSP2 differs from the first in that the recirculated information is OR'ed with the output of an AND gate 22, which receive one input directly from the AND gate 20, and another which is delayed by one column. This corresponds to the AND'ing of two adjacent video-elements. The word stored in ZSP2 represents columns of the scan pattern for which two adjacent bit locations are "black". It is called a second shadow signal. Both shadow signals are OR'ed together and passed by a multiplexer MUX1. This multiplexer is controlled by the release signal S1 emitted from the row tracking circuit, to enter the 16 bit combined shadow signals into a series-input, parallel-output register SIPO1. The two shadow signals are also logic-linked to one another via a AND gate 26 which thus emits a cleaned-up shadow signal S2.

The output of SIPO1 is fed to a decoder DEC. At its output, the decoder DEC emits two segmentation messages ZEL and ZER to a further switching unit SW2. The first segmentation message ZEL characterizes a character which lies to the left of the scan zone, and the second segmentation message characterizes a character to the right of the scan zone. The decoder DEC may conveniently be formed of a plurality of gates which examine the content of SIPO1 at two bits at the left end, and two bits at the right end of the stored word. If both reveal "white" signals, signifying that a character is completely passed in the scanned pattern, no segmentation message is output. If "black" signals appear, one of the two segmentation messages is output to signify that passing has not occurred.

Both segmentation messages which are supplied to a second switching unit SW2 and inhibits its operations. When no segmentation messages appear, SW2 produces a TRAP signal, in response to a release signal FR, which is output from a microprocessor system, and an output signal of a column counter SCTR. The TRAP signal can only occur when the column counter SCTR possesses its maximum count. The column counter is supplied with its counting input via a control signal RI produced by the correlation circuit COR. The signal RI signifies that the scanned character has become displaced by one column. Thus, SCTR is incremental for each column of movement of the scanning unit, and when "n" columns of movement have occurred, the capacity of the counter SCTR is reached and the switch SW2 is conditioned to produce the TRAP signal, in response to the TR signal, if there is no segmentation message.

The microprocessor system presets the counter SCTR to "n" after each TRAP signal (by means not shown). For this purpose, the column counter SCTR possesses a load input which is connected to the microprocessor system. When this counter has reached the maximum count, the second switching unit SW2 is supplied with a release signal for the TRAP, signal so that the microprocessor system receives the message that a complete character is contained in the scanning window of the scanner. Data relating to this character is then transferred to the microprocessor system via a transfer unit DMA.

The transfer circuit DMA contains a second multiplexer MUX2 which is supplied with the combined shadow signal via MUX1 and the signal S2 from the gate 26, and with the video-signal emitted from the AND gate 20. This multiplexer is controlled by the release signal S1 and a control signal S3 from the microprocessor. After a TRAP signal, the microprocessor causes MUX2 to first supply the combined and cleaned-up shadow signals (from MUX1 and gate 26) to the microprocessor storage via a serial-in, parallel-out register SIPO2, and an 8-bit data bus. Then the video information for the character is supplied to the microprocessor storage, gated with the release signal S1. The microprocessor examines the shadow signals and from them determines the width of the character and the location of vertical interruption. In this way, relatively narrow character parts near the left or right borders, may be ignored as not belonging to the character, if they are spaced from the main character shadow by relatively great distance. The microprocessor then, via the signal S3, controls the transfer of only that part of the scan pattern in which the parts of the actual character are found.

The register SIPO2 is a bidirectional series-parallel converter having a data width of 8 bits at its parallel inputs and outputs. This series-parallel converter forms the input circuit for the data bus D-BUS of the microprocessor system. This series-parallel converter is controlled by control signals AW, which are supplied by the microprocessor system, to allow the register to function in a bidirectional way. When the register functions as a parallel-in, series-out register, it receives an input from D-BUS and inserts it into the shift registers ZSP1 and ZSP2 via overriding inputs which are normally not effective. Thus, items of data transmitted via the data bus D-BUS from the microprocessor system can also be input into the registers ZSP1 and ZSP2 to function as masks to help in cleaning up the shadow signals. The bidirectional operation of the register SIPO2 are interleaved, in time, so they do not interfere with each other.

Figure 3:
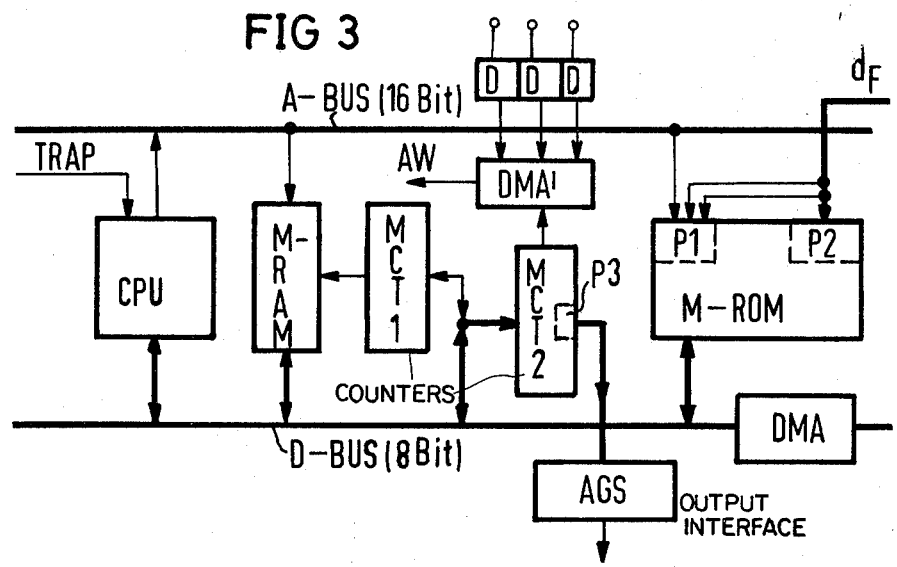
FIG. 3 is a functional block diagram of a microprocessor for controlling the preprocessing steps and classification of the scan characters.

The transfer circuit DMA forms the input for the video-data, transmitted with two shadows, into the microprocessor system. This is illustrated in FIG. 3. As soon as the video-data have been transferred to the working store M-RAM of the microprocessor system, triggered by the segmentation signal TRAP, buffered operation can commence. In other words, the scanning process and the following preprocessing of the video-signal is decoupled from the further preprocessing and analysis of the video-signal, and consequently the operating steps which remain to be explained run at least partially parallel to the scanning of the next pattern. This makes it unnecessary to complete analysis before the next character is scanned.

The circuitry of the microprocessor system illustrated in FIG. 3 can be constructed for example with the commercially available microprocessor system 8085. It assumes the function of the second preprocessing unit 4 with the assigned memory 4', in accordance with FIG. 1. In this system, in addition to the aforementioned working store M-RAM, a processor CPU and a microprogram memory M-ROM are connected to the data bus D-BUS. It also comprises an 8-bit counter MCT1 which is normally used as address register for the working store M-RAM. When video-data is to be transmitted, it serves as address counter which can be loaded from the microprocessor CPU. However, the microprocessor can also interrogate the address contained in the address register.

In this microprocessor system a second 8-bit counter MCT2 assumes a plurality of functions and can be loaded from the microprocessor CPU. When video-data is to be transferred it counts the number of 8-bit bytes which are to be transferred and terminates these as soon as a "1" signal appears at its counter output which is connected to a control unit DMA' assigned to the transfer circuit DMA, and which produces the control signal AW. This signal then serves to terminate the image transfer.

The items of video-data are entered into the working store M-RAM in such manner that a white element corresponds to a "1" state. A white byte can then be interrogated at the aforementioned output of the counter. Now a white byte or a black byte can be interrogated with one of the selector signals AW supplied to the transfer circuit. These bytes are transferred from the working store M-RAM to the second address counter until a change of state occurs in the bytes, whereupon the microprocessor CPU changes this selector signal.

The second address counter MCT2 is also employed as an output gate P3 of the microprocessor system. In this way the microprocessor CPU can emit items of data, e.g. character codes for a recognized character, to an output interface AGS. This also applies to values of the character width and the preliminary segmentation which can be emitted to corresponding registers in the described circuits. In addition it is also possible to emit data for test purposes. Whenever this second address counter MCT2 is used as an output gate, control signals which characterize the function of the counter are produced by the microprocessor CPU and fed to the address bus A-BUS.

The addresses for the working store M-RAM are emitted by the processor CPU to the data bus D-BUS together with a corresponding control signal. This control signal controls the transfer of the address into the corresponding address register, e.g. the first address register MCT1. Only then is the data byte transmitted on the data bus D-BUS, the control signal for which is a cycle signal "read" or "write".

Two further ports of the microprocessor system consist of the gates P1, P2 of the microprogram store. These are driven by the microprocessor CPU. They can be connected as input port or output port, although the first of these two gates is used exclusively for the input of the low-value bit positions of the classifier values $d_F$, which are yet to be explained, into the processor system.

The function of the processor system shown in FIG. 3 is to further process the transmitted video-signal. Until this processing is concluded, no further segmentation message can be accepted. An image clearing is carried out, in which video information not related to the character is cut off from the edges, i.e. replaced by white signals. In addition to this image clearing, the bit pattern contained in the working memory M-RAM is centered in both axes. For this purpose the central point of the character must firstly be established and then this point must be brought into a determinate position. However, this is not achieved by displacing the bit pattern contained in the working store by read-out and reinsertion, but instead the displacement is achieved by means of an address modification, using indexed addresses. At the same time, with the aid of the bit pattern, the size of the character is measured and the bit pattern is never further analyzed when its size is too small for a real character.

Figure 5:
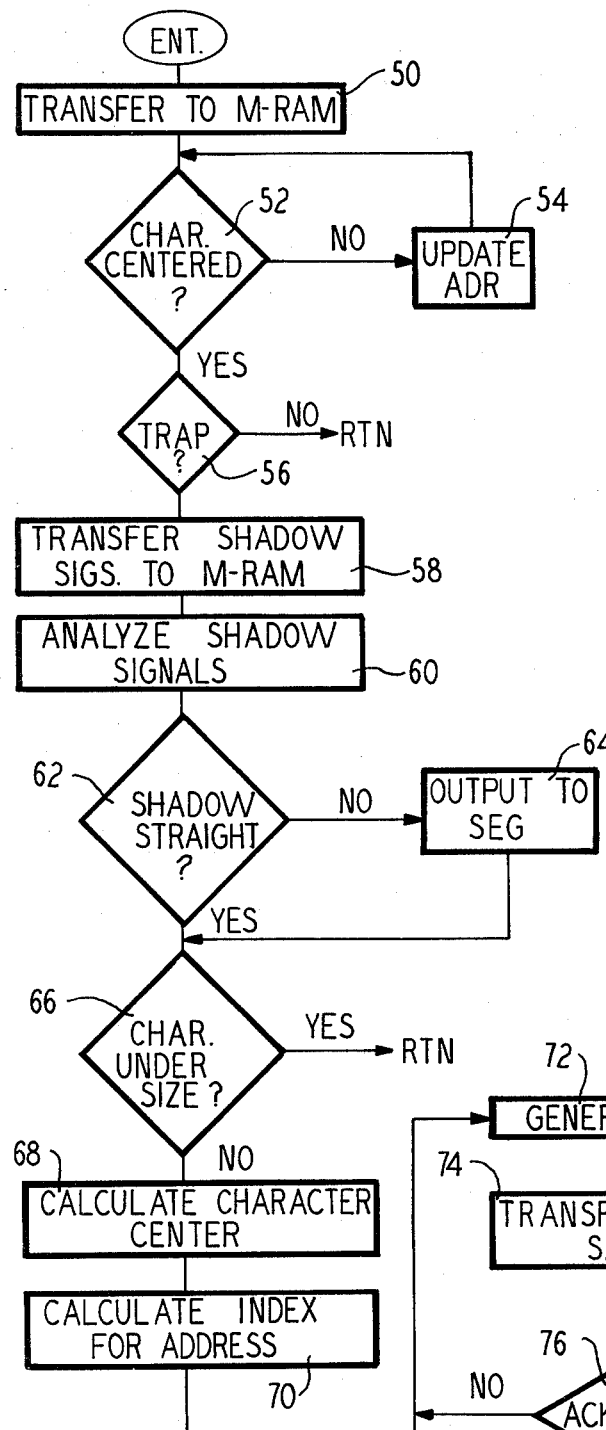
FIGS. 5 and 6 are flow charts showing operations which are carried out by the apparatus of the present invention.

Referring now to FIG. 5, a flow chart showing operation of the microprocessor system of FIG. 3 is illustrated. The decision units (diamonds) and operational units (rectangles) are illustrative of both the apparatus used and the functional steps taken. Unit 50 transfers to the M-RAM the shadow signals, and unit 52 determines whether they are centered. If not, the ADR address is updated, by unit 54, repetitively until centering is established. Then a unit 56 determines if a TRAP signal has been produced, and, if not, control returns to unit 50.

Figure 4:
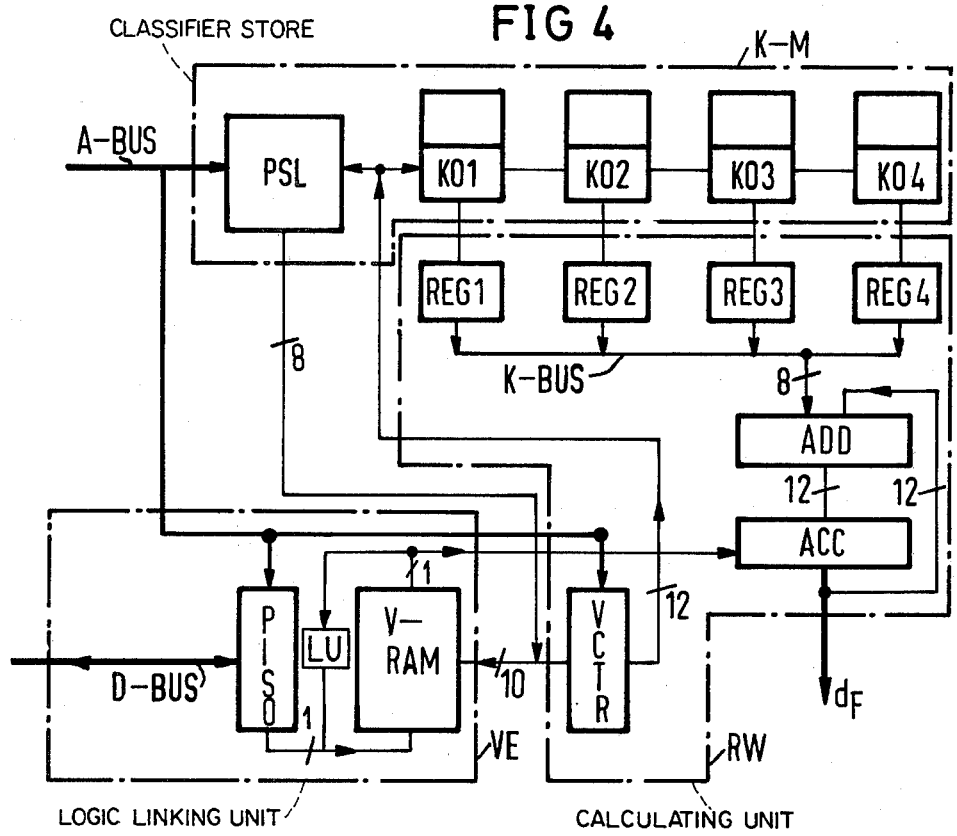
FIG. 4 is a functional block diagram of the fundamental components of the classifier circuits.

When a TRAP signal appears, unit 58 transfers the shadow signals to the M-RAM, and SCTR is reset. The unit 60 analyzes the shadow signals and deletes bits which are not character parts. Then unit 62 determines if the shadow is straight, and if not, a unit 64 outputs data over the D-bus to be entered into the register ZSP1 and ZSP2. Then unit 66 determines whether the character is undersize, and, if so, it is ignored and operation returns to unit 50. If not, units 68 and 70 calculate the center address and addressing index and unit 72 generates a "ready" signal for the satellite computer, and passes control to unit 74, which transfers the data to the satellite computer (FIG. 4). Unit 76 recognizes an acknowledgement signal from the satellite computer and returns control to unit 50.

When the bit pattern of the transmitted video-signal has been cleared and centered, the pre-processing of the scanned character is concluded and the further analysis is now fundamentally assumed by the recognition unit 5 of FIG. 1. The classification of the scanned and prepared character is carried out with the aid of a quadratic polynomial classifier as known per se. The circuits required for this purpose have been illustrated in FIG. 4 to show how this classification method known in connection with high speed document readers has been implemented with a special circuitry design for the purposes of a wand.

The circuit arrangement illustrated in FIG. 4 fundamentally represents a satellite computer which allows a character to again be classified in parallel to the preparation of the following character. This is achieved in that, having received the "ready" message from the microprocessor system, the satellite computer then causes the bit pattern which is to be classified to be transmitted from the working memory M-RAM of the microprocessor system as soon as the classification of the preceding character has been completed. This bit pattern is then transferred via the data bus D-BUS into a logic-linking unit VE. The latter comprises a parallelto-series converter PISO, which is arranged between the data but D-BUS and a feature memory V-RAM. The extent of the bit pattern entered into V-RAM is 256 bits, and the random access store has a capacity of 1024 bits. As soon as the bit pattern is transmitted into this store, the "received" message of the recognition unit is transmitted to the microprocessor system and the "received" message of the microprocessor system is reset. The microprocessor system is then in a position to prepare the next video-signal.

In addition to the logic linking unit VE, the recognition unit possesses a classifier store K-M. This includes a fixed word store PSL having a capacity of 2 K×8 which forms part of the program store of the microprocessor system. It also includes four sub-stores KO1 to KO4 having a capacity of 4 K×8 which contain the coefficients of a classifier, as will be explained in the following.

In a calculating unit RW, the outputs of these four sub-stores KO1 to KO4 are each connected to a calculating unit register REG1, REG2, REG3 and REG4, respectively. Their outputs are commonly connected via a classifier bus K-BUS to the input of a 12-bit adder ADD which is connected to a 12-bit accumulator ACC. Calculated $d_F$-values are emitted from the output of this accumulator and—as can be seen from FIG. 3—transferred to the microprogram store M-ROM of the microprocessor system.

In order to explain the mode of operation of this recognition unit, we shall firstly briefly discuss the known classification method which employs a quadratic polynomial classifier. In these classification methods the class association of a character pattern is expressed by a calculated estimation function:

$$d_F = a_o + \sum_{i=1}^{i=i\max} a_{iF} x_i$$

where

F = number of the significance classes,
$a_o$ = a constant,
$a_{iF}$ = coefficient of the polynomial,
$x_i$ = linear character features and quadratic logic lines, i.e. $a_F$ is the coefficient vector of the polynomial associated with class F and x is the property vector formed from the features and quadratic logical combinations of features.

One of the most important features of this classification method in terms of its recognition reliability consists in the optimization of the polynomial formula in respect of the linear and quadratic elements, and in respect of their number i. The use of quadratic classifiers results in a considerable improvement in efficiency with a reduced expense. In the present case a maximum of i=768 elements are formed. The recognition reliability is also governed by the manner in which the learning process is carried out, in which the coefficient vectors are determined in a regression analysis. As this can be effected for different types of script, non-linear classification methods of this kind can be adapted to various types of script. This means that the wand of the present invention can be adapted to the desired type of script by exchanging the contents of the classifier store K-M.

When applied to the recognition unit illustrated in FIG. 4, the analysis process now takes place as follows: the character pattern which has been finally prepared and centered in the microprocessor system is transferred into the feature store V-RAM from the D-BUS, via the parallel-series converter PISO. The logic-linking instructions, i.e. the information as to which features are to be logically combined, are stored in the fixed word store PSL of the classifier store K-M in the form of feature store addresses. The feature store V-RAM obtains the logic-link addresses from the fixed word store PSL of the classifier store K-M which is operated by the address counter V-CTR. The features read out from the feature store are logically combined by a logic unit LU and entered into different storage locations of V-RAM. The feature logic-linking is "1" whenever the contents of the two addresses associated with the logic-link is "1" and is otherwise "0".

With the aid of these previously formed and stored logic-links, the $d_F$-values of the individual character classes are calculated consecutively for a character.

Theoretically, the bit pattern represents a feature-vector having 256 components or image points. From this feature-vector, through a selection of individual ones of the its components (linear elements), and through a selection of logically combined linear components (quadratic elements), a property vector is produced. The PSL unit contains the addresses of the linear elements to be selected and the addresses of the components of the quadratic elements. These addresses are derived for a specific character font, i.e., they are "font-"—specific. The property vector is multiplied in scalar fashion with weighting coefficients $a_{iF}$ to obtain a specific estimated value $d_F$. This can be regarded as a criterion for the probability that the character being scanned corresponds to a given character. The $d_F$ values are calculated for all classes (i.e for all possible characters). The scanned character is then allocated to that class for which the highest $d_F$ value is calculated.

The first step in the operation of the apparatus of FIG. 4 is the determination of the property vector from the feature vector. The CPU of the satellite computer addresses PSL via the A-Bus with the VCTR being loaded with an initial value by the CPU. VCTR then autonomously counts up. It thus addresses the PSL-ROM during the successive read-out via twelve address lines. The outputs of the PSL supply an 8-bit address of the elements to be logic-linked to the V-RAM. A component of the feature vector is thus addressed. Two successive results, respectively, are logic-linked with one another in the logic unit LU. In the case of linear elements, the same component of the feature vector is read twice in order to not require any special handling for the quadratic elements. The result is written into another region of the V-RAM addressed by VCTR. After completion of all the logic-linkages, the property vector is in the V-RAM.

Of the 1024 storage locations of the V-RAM, 512 are devoted to the feature vector and the remainder store up to 764 linear and quadratic elements and the constant element $a_o$.

The coefficients $a_{iF}$ of the classifier are accommodated in the sub-stores KO1 to KO4 in such manner that the first coefficient of the first character class is contained in the first sub-store, the second in the second sub-store and so on, and the fifth is then again contained in the first sub-store. Each coefficient is preferably 8 bits wide and represents a decimal value in steps of 0.0039. This arrangement of the coefficients in the sub-stores KO1 to KO4 allows the $d_F$-values of the individual character classes to be calculated consecutively in one calculating step.

Four coefficients are in each case transferred in parallel into the calculating unit registers REG1 to REG4. These four registers are operated by the address counter V-CTR, which also addresses the sub-stores KO1 to KO4, in such manner that tri-state outputs of the individual registers are switched through consecutively. Thus the coefficients on the classifier bus K-BUS are consecutively connected to the actual calculating circuit composed of the adder ADD and the accumulator ACC. The associated logic-links are simultaneously read out from the feature store V-RAM and fed to the accumulator ACC. Only when the associated logic-link is "1", is the corresponding coefficient added in the accumulator ACC. When the $d_F$-value of a character class has been calculated, it is read out from the accumulator ACC and returned to the microprocessor system.

In operation: the VCTR is charged by the CPU to an initial value, and subsequently autonomously counts up. VCTR addresses: KO1 through KO4 for the read-out of the coefficients $a_{iF}$ and also addresses the V-RAM for the read-out of the properties $x_i$.

From KO1 through KO4 four coefficients (32 bits) are read-out in parallel fashion and written into the registers REG1 through REG4 with tristate outputs (K-Bus). Addressed by the two lowest bits of the VCTR, REG1 through REG4 are successively connected (or switched) to the K-Bus and conveyed to the adder ADD. The adder ADD, moreover, receives from ACC the accumulated sum. Thus, the sum of the old sum plus the coefficient is connected to the output of the adder ADD.

Synchronously with the read-out of the coefficients, the respective values for the properties $x_i$ are read out from the V-RAM. When $x_i=1$, the new sum at the output of the ADD is taken over, but when $x_i=0$, the new sum at the output of the adder ADD is not taken over into the accumulator ACC, and no addition of the coefficient has taken place.

In this manner, the calculation of the $d_F$-value of the first character class is continued until all coefficients have been processed. The VCTR is at its maximum counter reading. The CPU receives, in this instance, an interrupt from VCTR. Subsequently, the CPU actuates, via the data and address lines, the ports P1, P2, in the M-ROM, arranged in the microprogram memory. It takes, via the latter, the $d_F$-value (12 bits)—calculated to completion—of the first character class to the bus line D-Bus, and sets the value into internal registers for the purpose of further processing. Continuation of the calculation for the second character class is analogous to the above. Here the number of processed character classes is likewise counted in an internal register of the CPU, and the $d_F$ calculation is terminated when this number has reached the number of possible character classes.

The microprocessor system does not participate in the calculation of the $d_F$-values and during this time can carry out the maximum value investigations of the consecutively calculated $d_F$-values and the $RAD^2$-value. The microprocessor system then inquires of the calculating unit RW as to whether another calculated $d_F$-value is available.

Following the calculation of all the $d_F$-values, the $RAD^2$ value and also the maximum $d_F$-value are known. In dependence upon the magnitude of the $RAD^2$ value, either a rejection or a character recognition—as described—is emitted to the output interface AGS. A new character preparation can then commence in the microprocessor system.

Figure 6:
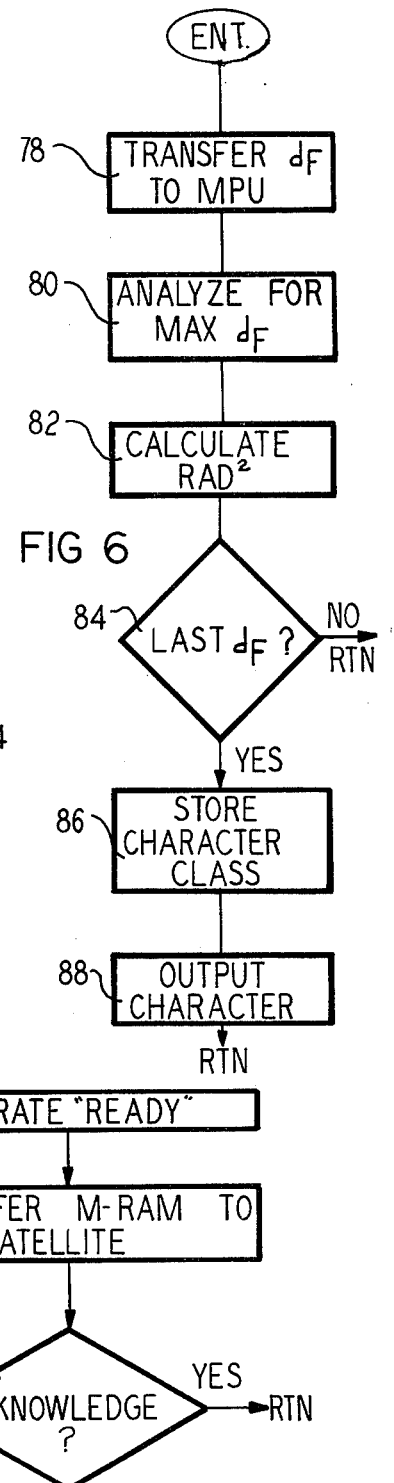

Referring to FIG. 6, a flow chart is shown of the microprocessor operations relative to the $d_F$-values. The program is entered when a $d_F$-value is supplied to the microprocessor from the satellite computer via unit 78. Unit 80 then compared the new $d_F$ value with previous ones calculated for the scanned character, to select the largest $d_F$-value, and unit 82 calculates $RAD^2$. Then unit 84 determines whether all the $d_F$ values have been inspected, and, if not, returns control either to unit 50 (FIG. 5) or unit 78. When all the $d_F$-values have been inspected, unit 86 stores the class determined for the character and unit 88 outputs the character to the AGS (FIG. 3).

It is apparent that various modifications and additions may be made in the apparatus of the present invention, without departing from the essential features of novelty thereof, which are intended to be defined and secured by the appended claims.

We claim:

1. In an optical wand for automatic character recognition having a scanning unit which is manually movable along a line of print on a data carrier, a light source controlled in its intensity in accordance with the average reflected brightness from said data carrier, a photodiode matrix having at least 1024 elements for scanning a field of said data carrier, and an output circuit for producing a digital video signal representing a scan pattern, the combination comprising a pre-processing unit for the segmentation and centering of the scanned pattern and a recognition unit for classifying a preprocessed scan pattern, said preprocessing unit including a correlation unit connected to said scanning unit for disjunctively logically linking corresponding positions of the individual elements of consecutive scan patterns, a row tracking circuit for producing a release signal by which an analysis zone of said video-signal is filtered out, a segmentation circuit which serves to presegment a character within said analysis zone, and a microprocessor system decoupled from the scanning unit for completing the segmentation of a character and for clearing and centering said character relative to its axes; said recognition unit connected to said preprocessing unit and decoupled therefrom for performing a quadratic polynomial classification by calculating selection values for a plurality of characters.

2. An optical wand according to claim 1, wherein said recognition unit includes a satellite computer connected via an address bus and a data bus to said micro-processor system, a classifier store in which a part of the micro-program store of the micro-processor system is used as fixed word store for feature addresses which are to be logic-linked, said classifier store having four sub-stores for storing classifier coefficients, means for connecting data outputs of the fixed word store corresponding to feature addresses to a logic-link unit having a feature store in which can be stored the features of the bit pattern to be analysed, and logic-links of said features, said substores being connected to a calculating unit in which the class values are automatically calculated from the classifier coefficients and the properties with an adder and an accumulator.

3. An optical wand according to claim 2, including an address couter for addressing said fixed word store and said substores with said classifier coefficients, and means for connecting the input and output of said feature store to a logic unit.

4. An optical wand according to claim 2, wherein said classifier coefficients are stored in interleaved fashion in the sub-stores, and the outputs of each of the sub-stores are connected to one of a plurality of calculating unit registers, which are connected by pulse-controlled tri-state outputs to a classifier bus, whereby four classifier coefficients can be read out in parallel and connected in serial fashion to the calculating circuit of the calculating unit.

5. An optical wand according to claim 1, wherein said correlation unit comprises a first image store having a capacity for one scan pattern and a second image store with a like capacity, a comparator circuit connected between the two image stores for controlling a switching unit in which video-signal elements corresponding to one another are disjunctively logic-linked to one another, means for connecting said switching unit to said second image store, means for connecting said row tracking circuit to the output of said correlation unit in order to compensate vertical position shifts of the scan field relative to the row of print on said data carrier in order to characterize an analysis zone which is considerably reduced in height relative to said scan zone.

6. An optical wand according to claim 5, wherein said segmentation circuit comprises an intermediate store having first and second registers each of which store one row of the video-signal, said first register forming a first horizontal shadow of the scan pattern by disjunctive overwriting of the store contents with the supplied video-signal, said second register forming a second shadow formed by the combining conjunctively the video-signal directly and after being delayed by one bit whereby vertical white columns, as white elements located adjacent to black elements can be withdrawn from the two shadows for the pre-segmentation of a character from the scan pattern.

7. An optical wand according to claim 1, wherein said preprocessing unit is connected by a multiplexer and a bidirectional series parallel converter to said microprocessor system, said microprocessor system operating as a second preprocessing unit in response to a segmentation signal from the first preprocessing unit, said microprocessor system receiving data from said first preprocessing unit and storing said data in fixed position, the centering of the stored bit pattern being carried out by calculating the center point of the character and by calculating an index value for an address modification.

* * * * *